United States Patent
Zhou et al.

(10) Patent No.: US 10,108,180 B2
(45) Date of Patent: Oct. 23, 2018

(54) NUMERICALLY CONTROLLED SYSTEM AND NUMERICALLY CONTROLLED MACHINE TOOL

(71) Applicant: SHENZHEN A&E INTELLIGENT TECHNOLOGY INSTITUTE CO., LTD., Shenzhen, Guangdong (CN)

(72) Inventors: Yu Zhou, Guangdong (CN); Shusheng Yang, Guangdong (CN)

(73) Assignee: HENZHEN A&E INTELLIGENT TECHNOLOGY INSTITUTE CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/550,367

(22) PCT Filed: Feb. 2, 2016

(86) PCT No.: PCT/CN2016/073136
§ 371 (c)(1),
(2) Date: Aug. 10, 2017

(87) PCT Pub. No.: WO2016/127852
PCT Pub. Date: Aug. 18, 2016

(65) Prior Publication Data
US 2018/0024533 A1      Jan. 25, 2018

(30) Foreign Application Priority Data

Feb. 11, 2015   (CN) .......................... 2015 1 0072768

(51) Int. Cl.
G06F 3/06          (2006.01)
G05B 19/414     (2006.01)
(Continued)

(52) U.S. Cl.
CPC ........... *G05B 19/414* (2013.01); *G05B 19/12* (2013.01); *G05B 19/18* (2013.01); *G06F 3/0607* (2013.01);
(Continued)

(58) Field of Classification Search
USPC ........................................ 711/103
See application file for complete search history.

(56) References Cited

U.S. PATENT DOCUMENTS

2006/0274566 A1*  12/2006  Takashima .......... G06F 12/0246
                                                                 365/145
2008/0046640 A1*   2/2008  Han ...................... G06F 1/3203
                                                                 711/103
(Continued)

FOREIGN PATENT DOCUMENTS

CN         101169641 A       4/2008
CN         102591588 A       7/2012
(Continued)

*Primary Examiner* — Shawn X Gu
*Assistant Examiner* — Jean C Edouard
(74) *Attorney, Agent, or Firm* — Andrew C. Cheng

(57) ABSTRACT

The present disclosure provides a numerical control system and a numerical control machine tool. The NCS includes a storage and a MCU capable of reading data from and writing data into the storage. The MCU includes a data buffer, the storage includes an internal memory and a flash memory, the internal memory is configured to store data and programs which are needed when the MCU is in operation. The flash memory includes at least one of SD card memory and eMMC memory, and a built-in NAND-Flash memory. The NAND-Flash memory is configured to store system files of the NCS, and the SD card memory and the eMMC memory both are configured to store the system files and user data of the NCS, which enables the NCS to be workable in the absence of external SD card memory.

19 Claims, 1 Drawing Sheet

(51) Int. Cl.
*G06F 13/00* (2006.01)
*G05B 19/18* (2006.01)
*G05B 19/12* (2006.01)

(52) U.S. Cl.
CPC .......... *G06F 3/0625* (2013.01); *G06F 3/0643* (2013.01); *G06F 3/0656* (2013.01); *G06F 3/0659* (2013.01); *G06F 3/0679* (2013.01); *G06F 13/00* (2013.01); *G05B 2219/34192* (2013.01); *Y02P 70/161* (2015.11)

(56) References Cited

U.S. PATENT DOCUMENTS

| | | | |
|---|---|---|---|
| 2009/0235013 A1* | 9/2009 | Seo | G06F 12/0246 711/103 |
| 2013/0185479 A1* | 7/2013 | Lin | G06F 12/145 711/103 |
| 2013/0185491 A1* | 7/2013 | Lin | G06F 13/1605 711/104 |
| 2014/0068147 A1* | 3/2014 | Ou | G06F 12/0246 711/103 |
| 2014/0208014 A1* | 7/2014 | Voutilainen | G11C 7/1006 711/103 |
| 2014/0372666 A1* | 12/2014 | Moioli | G11C 7/1045 711/103 |
| 2015/0193157 A1* | 7/2015 | Hwang | G11C 16/06 714/764 |
| 2015/0227319 A1* | 8/2015 | Li | G06F 11/14 711/102 |
| 2015/0363122 A1* | 12/2015 | Hasegawa | G06F 11/1441 711/154 |
| 2016/0162187 A1* | 6/2016 | Lee | G06F 12/0246 711/103 |
| 2016/0335011 A1* | 11/2016 | Lee | G06F 3/0619 |

FOREIGN PATENT DOCUMENTS

| | | | | |
|---|---|---|---|---|
| CN | 104111851 | * | 10/2014 | ............ G06F 9/445 |
| CN | 104111851 A | | 10/2014 | |
| CN | 104679609 A | | 6/2015 | |

* cited by examiner

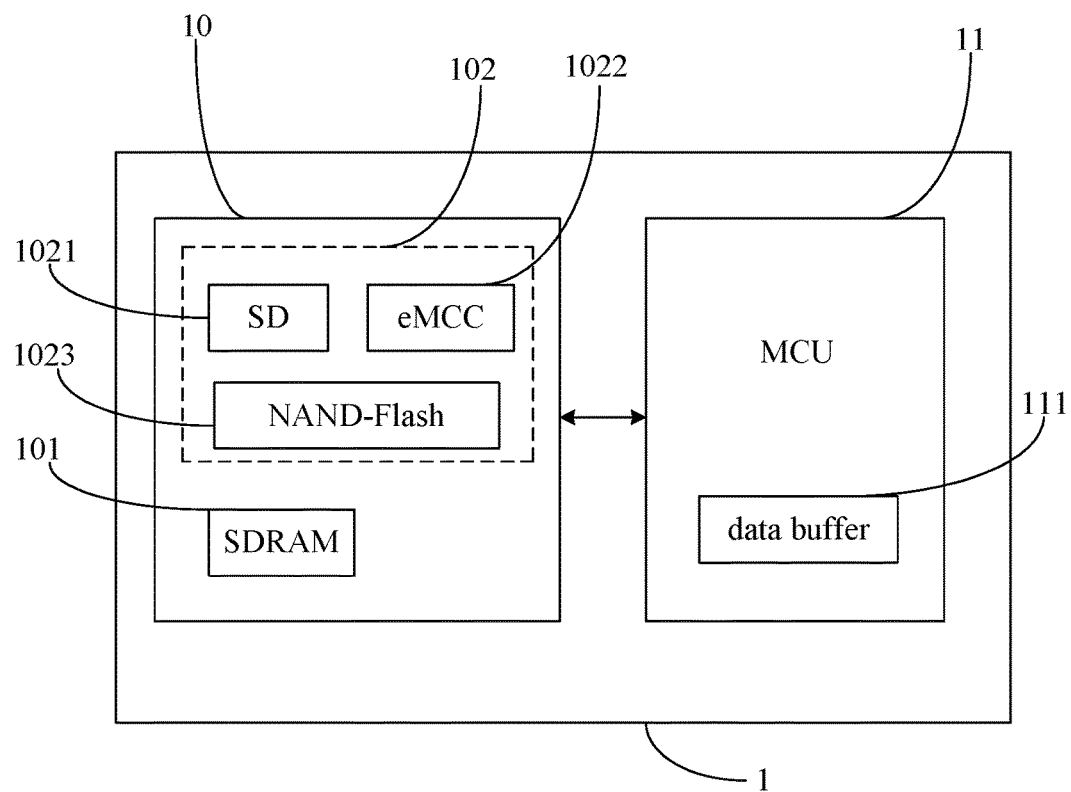

NUMERICALLY CONTROLLED SYSTEM AND NUMERICALLY CONTROLLED MACHINE TOOL

CROSS-REFERENCE TO RELATED APPLICATIONS

This is a national stage application of PCT Application No. PCT/CN2016/073136, filed on Feb. 2, 2016, claiming foreigning priority of Chinese Patent Application No. 201510072768.4, filed on Feb. 11, 2015, the contents of all of which are hereby incorporated by reference.

TECHNICAL FIELD

This disclosure relates generally to the field of numerical control, and more particularly, to a numerical control system and a numerical control machine tool.

BACKGROUND

CNC (Computer Numerical Control) machine tools are the main machining equipments in mechanical machining field. Based on an ordinary machine tool, a Numerical control machine tool has an additional digital control function, which can improve the machining precision, improve the capacity of machining complex workpieces, do a quick response to change of the machined parts, and increase the production efficiency greatly. A numerical control system (NCS) is the control brain of the Numerical control machine tool. The NCS' quality directly affects the machining quality and the machining efficiency of the Numerical control machine tool. Storage is one of the core parts of NCS, and it has a great influence on the whole performance of NCS.

With the rapid development of semiconductor technology, storage is developing from low speed and small capacity to high speed and large capacity. Storage used in the NCS is generally divided into two categories: internal memory and flash memory. The internal memory is configured to store data and programs which are needed when the CPU is in operation. The internal memory has a great effect on the operation speed of the CPU. An internal memory with a high storage capacity can effectively increase the speed and stability of the system, while an internal memory with a low storage capacity will become a bottleneck affecting the performance of the whole system. Flash memory is a non-volatile memory and doesn't lose data when power turns off. Flash memory is mainly used to store data for a long time.

As the main storage scheme many years ago, the storage scheme of SRAM+DDR+CF of the NCS has experienced the rapid development of semiconductor technology in recent years, and no longer has obvious technical advantages, but at the same time shortcomings begin to appear.

From read-write speed of a storage, storage capacity, price, market applications and other aspects, analysis is done as below:

SRAM: the mainstream capacity is 4 Mb, the read-write time is 45 ns. The development of SRAM technology is slow, and there is no qualitative leap in recent years. The disadvantage is that the capacity is small and the price is expensive.

DDR SDRAM: the mainstream capacity is 512 Mb, the maximum capacity is 1 Gb, the maximum frequency is 200 MHz. The development of DDR technology is rapid and it is developed from DDR to DDR2, DDR3. The speed of reading and writing has doubled, and the maximum frequency of DDR3 has reached 1066 MHz. The latest DDR4 technology has already been put into production.

CF card: the mainstream capacity is 4 GB and the maximum speed of reading and writing is 25 MB/s. CF cards have been completely replaced by SD cards in the field of digital products, but still occupied the mainstream position in the industrial control field. The disadvantage of CF card is expensive. The maximum read and write speed of a 4 GB SD card is 20 MB/s.

In addition, the storage scheme SRAM+DDR+CF having only removable CF card as saving system files and user data, the CNS cannot be used in the absence of CF card.

Therefore, it is desirable to provide a CNS and a Numerical control machine tool to solve the above problems.

SUMMARY

The present disclosure provides an NCS and a numerical control machine tool, wherein the NCS is useable in the absence of external SD card memory and can double back up the system files and user data of the NCS, improve the convenience and reliability of NCS, and reduce the power consumption and cost.

In order to solve the above problems, the present disclosure provides a NCS including a storage and a MCU capable of reading data from and writing data into the storage, wherein the MCU includes a data buffer, the storage includes an internal memory and a flash memory, the internal memory is configured to store data and programs which are needed when the MCU is in operation; wherein the flash memory comprises at least one of SD card memory and eMMC memory, and a fixed built-in NAND-Flash memory; the NAND-Flash memory is configured to store system files of the NCS, the SD card memory and the eMMC memory both are configured to store the system files and user data of the NCS; when the flash memory uses a combination of the NAND-Flash memory and the SD card memory, the MCU reads the system files stored in the NAND-Flash memory and the user data stored in the SD card memory, the system files stored in the SD card memory are for backup purposes; when the flash memory uses a combination of the NAND-Flash memory and the eMMC memory, the MCU reads the system files stored in the NAND-Flash memory and the user data stored in the eMMC memory, the system files stored in the eMMC memory are for backup purposes; when the flash memory uses a combination of the NAND-Flash memory, the SD card memory and the eMMC memory, the MCU reads the system files stored in one of the NAND-Flash memory and the SD card memory, the system files stored in the other one of the NAND-Flash memory and the SD card memory are for backup purposes; and reads the user data stored in one of the SD card memory and the eMMC memory, the user data stored in the other one of the SD card memory and the eMMC memory is for backup purposes, the internal memory is an SDRAM memory, the SD card memory is further configured to store system upgrade files.

In some embodiments, the MCU is specifically configured to receive a request of reading data and judge whether the data buffer contains the requested data; when the data buffer contains the requested data, the MCU reads the requested data from the data buffer; when the data buffer does not contain the requested data, the MCU triggers an operation of reading the flash memory and reads the requested data from the flash memory; and receive a request of writing data and judge whether the data buffer is full; when the data buffer is full, the MCU writes the data stored in the data buffer to the corresponding flash memory and then writing the to-bewritten data to the data buffer; when the data buffer is not full, the MCU writes the to-be-written data to the data buffer directly.

In some embodiments, the NCS further includes a circuit board, the NAND-Flash memory is fixedly mounted on the circuit board.

In some embodiments, the eMMC memory is fixedly mounted on the circuit board.

In some embodiments, the SD card memory is mounted on the circuit board in a detachable manner.

In some embodiments, the model of the SDRAM memory is DDR3 SDRAM or over the DDR3 SDRAM.

In some embodiments, when the flash memory uses a combination of the NAND-Flash memory and the SD card memory, the MCU reads the system upgrade files from the SD card memory and upgrades the system; when the upgrade is successful, the MCU writes the upgraded system files into the NAND-Flash memory; when the upgrade fails, the MCU still reads the system files from the NAND-Flash memory; when the flash memory uses a combination of the NAND-Flash memory, the SD card memory and the eMMC memory, the MCU reads the system upgrade files from the SD card memory and upgrades the system, when the upgrade is successful, the MCU writes the upgraded system files into the NAND-Flash memory and the eMMC memory; when the upgrade fails, the MCU still reads the system files from the NAND-Flash memory.

In some embodiments, when the NCS is started, the MCU is capable of selecting one of the NAND-Flash memory and the SD card memory to read the system files from, the MCU sends out a data request for reading the system files and checks whether the data buffer contains the system files, when the data buffer contains the system files, the MCU reads the system files from the data buffer; when the data buffer does not contain the system files, the MUC reads the system files from the selected one of the NAND-Flash memory and the SD card memory; during the operation of the NCS, the MCU is capable of selecting one of the SD card memory and the eMMC memory to read the user data from, the MCU sends out a data request for reading the user data and checks whether the data buffer contains the user data, when the data buffer contains the user data, the MCU reads the user data from the data buffer; when the data buffer does not contain the user data, the MCU reads the user date from the selected one of the SD card memory and the eMMC memory; during the operation of the NCS, the MCU is capable of selecting one of the SD card memory and the eMMC memory to write the user data into, the MCU sends out a data request for writing the user data and judges whether the data buffer is full; when the data buffer is full, the MCU writes the data stored in the data buffer to the corresponding flash memory and writes the to-be-written user data into the data buffer; when the data buffer is not full, the MCU writes the to-be-written user data to the data buffer directly.

In another aspect, the present disclosure provides an NCS including a storage and a MCU capable of reading data from and writing data into the storage, wherein the MCU includes a data buffer, the storage includes an internal memory and a flash memory, the internal memory is configured to store data and programs which are needed when the MCU is in operation; wherein the flash memory includes at least one of a SD card memory and an eMMC memory, and a fixed built-in NAND-Flash memory; the NAND-Flash memory is configured to store system files of the NCS, the SD card memory and the eMMC memory both are configured to store the system files and user data of the NCS; when the flash memory uses a combination of the NAND-Flash memory and the SD card memory, the MCU reads the system files stored in the NAND-Flash memory and the user data stored in the SD card memory, the system files stored in the SD card memory are for backup purposes; when the flash memory uses a combination of the NAND-Flash memory and the eMMC memory, the MCU reads the system files stored in the NAND-Flash memory and the user data stored in the eMMC memory, the system files stored in the eMMC memory are for backup purposes; when the flash memory uses a combination of the NAND-Flash memory, the SD card memory and the eMMC memory, the MCU reads the system files stored in one of the NAND-Flash memory and the SD card memory, the system files stored in the other one of the NAND-Flash memory and the SD card memory are for backup purposes; and reads the user data stored in one of the SD card memory and the eMMC memory, the user data stored in the other one of the SD card memory and the eMMC memory is for backup purposes.

In some embodiments, the MCU is specifically configured to receive a request of reading data and judge whether the data buffer contains the requested data; when the data buffer contains the requested data, the MCU reads the requested data from the data buffer; when the data buffer does not contain the requested data, the MCU triggers an operation of reading the flash memory and reads the requested data from the flash memory; and receive a request of writing data and judge whether the data buffer is full; when the data buffer is full, the MCU writes the data stored in the data buffer to the corresponding flash memory and then writes the to-be-written data to the data buffer; when the data buffer is not full, the MCU writes the to-be-written data to the data buffer directly.

In some embodiments, the NCS further includes a circuit board, the NAND-Flash memory is fixedly mounted on the circuit board.

In some embodiments, the eMMC memory is fixedly mounted on the circuit board.

In some embodiments, the SD card memory is mounted on the circuit board in a detachable manner.

In some embodiments, wherein the internal memory is an SDRAM memory.

In some embodiments, wherein the model of the SDRAM memory is DDR3 SDRAM or over the DDR3 SDRAM.

In some embodiments, wherein the SD card memory is further configured to store system upgrade files.

In some embodiments, when the flash memory uses a combination of the NAND-Flash memory and the SD card memory, the MCU reads the system upgrade files from the SD card memory and upgrades the system; when the upgrade is successful, the MCU writes the upgraded system files into the NAND-Flash memory; when the upgrade fails, the MCU still reads the system files from the NAND-Flash memory; when the flash memory uses a combination of the NAND-Flash memory, the SD card memory and the eMMC memory, the MCU reads the system upgrade files from the SD memory and upgrades the system, when the upgrade is successful, the MCU writes the upgraded system files into the NAND-Flash memory and the eMMC memory; when the upgrade fails, the MCU still reads the system files from the NAND-Flash memory.

In some embodiments, when the NCS is started, the MCU is capable of selecting to one of the NAND-Flash memory and the SD card memory to read the system files from, the MCU sends out a data request for reading the system files and checks whether the data buffer contains the system files, when the data buffer contains the system files, the MCU reads the system files from the data buffer; when the data buffer does not contain the system files, the MUC reads the system files from the selected one of the NAND-Flash memory and the SD card memory; during the operation of the NCS, the MCU is capable of selecting one of the SD card memory and the eMMC memory to read the user data from, the MCU sends out a data request for reading the user data and checks whether the data buffer contains the user data, when the data buffer contains the user data, the MCU reads the user data from the data buffer; when the data buffer does not contain the user data, the MCU reads the user date from the selected one of the SD card memory and the eMMC memory; during the operation of the NCS, the MCU is capable of selecting one of the SD card memory and the eMMC memory to write the user data into, the MCU sends out a data request for writing the user data and judges whether the data buffer is full; when the data buffer is full, the MCU writes the data stored in the data buffer to the corresponding flash memory and writes the to-be-written user data into the data buffer; when the data buffer is not full, the MCU writes the to-be-written user data to the data buffer directly.

In order to solve the above problems, the present disclosure further provides a numerical control machine tool including a machine tool body and a NCS mounted on the machine tool body, wherein the NCS includes a storage and a MCU capable of reading data from and writing data into the storage, the MCU includes a data buffer, the storage includes an internal memory and a flash memory, the internal memory is configured to store data and programs which are needed when the MCU is in operation; wherein the flash memory includes at least one of SD card memory and eMMC memory, and a fixed built-in NAND-Flash memory; the NAND-Flash memory is configured to store system files of the NCS, the SD card memory and the eMMC memory both are configured to store the system files and user data of the NCS; when the flash memory uses a combination of the NAND-Flash memory and the SD card memory, the MCU reads the system files stored in the NAND-Flash memory and the user data stored in the SD card memory, the system files stored in the SD card memory are for backup purposes; when the flash memory uses a combination of the NAND-Flash memory and the eMMC memory, the MCU reads the system files stored in the NAND-Flash memory and the user data stored in the eMMC memory, the system files stored in the eMMC memory are for backup purposes; when the flash memory uses a combination of the NAND-Flash memory, the SD card memory and the eMMC memory, the MCU reads the system files stored in one of the NAND-Flash memory and the SD card memory, the system files stored in the other of the NAND-Flash memory and the SD card memory are for backup purposes; and reads the user data stored in one of the SD card memory and the eMMC memory, the user data stored in the other of the SD card memory and the eMMC memory is for backup purposes.

Advantages of the disclosure may follow. Different from the prior art, in the storage scheme of the present disclosure, the internal memory adopts SDRAM, the flash memory adopts a combination of at least one of the SD card memory and the eMMC memory, and the built-in NAND-Flash memory. The NAND-Flash memory stores system files, which enables the NCS to be useable in the absence of external SD card memory. The SD card memory and the eMMC memory store system files and user data, which not only can be used in the starting of the NCS and reading and writing of the user data, but also can double back up the system files and the user data of the NCS, thereby improve the convenience and reliability of the NCS and reduce the power consumption and cost.

BRIEF DESCRIPTION OF THE DRAWINGS

FIGURE is a block diagram of an NCS according to an embodiment of the disclosure.

DETAILED DESCRIPTION

The detailed description set forth below is intended as a description of the present disclosure with reference to the appended FIGURE and embodiments.

In this embodiment, the numerical control system (NCS) 1 may include a storage 10 and an MCU 11 capable of reading data from and writing data into the storage 10.

The MCU 11 may include a data buffer 111. The storage 10 may include an internal memory 101 and a flash memory 102.

The internal memory 101 may be configured to store data and programs which are needed when the MCU 11 is in operation. The flash memory 102 may include at least one of an SD card memory 1021 and an eMMC memory (Embedded Multi Media Card) 1022, and a built-in NAND-Flash memory 1023.

The NAND-Flash memory 1023 may be configured to store system files of the NCS 1. The SD card memory 1021 and eMMC memory 1022 may be configured to store the system files and user data of the NCS 1.

When the flash memory 102 uses a combination of the NAND-Flash memory 1023 and the SD card memory 1021, the MCU 11 reads the system files stored in the NAND-Flash memory 1023 and the user data stored in the SD card memory 1021. The system files stored in the SD card memory 1021 are for backup purposes.

When the flash memory 102 uses a combination of the NAND-Flash memory 1023 and the eMMC memory 1022, the MCU 11 reads the system files stored in the NAND-Flash memory 1023 and the user data stored in the eMMC memory 1022. The system files stored in the eMMC memory 1022 are for backup purposes.

When the flash memory 102 uses a combination of NAND-Flash memory 1023, the SD card memory 1021 and eMMC memory 1022, the MCU 11 reads the system files stored in one of the NAND-Flash memory 1023 and the SD card memory 1021, the system files stored in the other of the NAND-Flash memory 1023 and the SD card memory 1021 are for backup purposes, and reads the user data stored in one of the SD card memory 1021 and eMMC memory 1022, the user data stored in the other of the SD card memory 1021 and eMMC memory 1022 is for backup purposes.

Preferably, the MCU 11 may be specifically configured to: receive a request of reading data and judge whether the data buffer 111 contains the requested data, if the data buffer 111 contains the requested data, the MCU 11 reads the requested data from the data buffer 111; if the data buffer 111 does not contain the requested data, the MCU 11 triggers an operation of reading the flash memory 102 and reads the requested data from the flash memory 102; and receive a request of writing data and judge whether the data buffer 111 is full, if the data buffer 111 is full, the MCU 11 writes the data stored in the data buffer 111 to the corresponding flash memory 102 and then writes the to-be-written data to the data buffer 111; if the data buffer 111 is not full, the MCU 11 writes the to-be-written data to the data buffer 111 directly.

Preferably, the NCS 1 may further include a circuit board (not shown), and the NAND-Flash memory 1023 may be fixedly mounted on the circuit board.

Preferably, the eMMC memory 1022 may be fixedly mounted on the circuit board

Preferably, the SD card memory 1021 may be mounted on the circuit board in a detachable manner.

Preferably, the internal memory 101 may be a SDRAM (synchronous dynamic random access memory) memory 101.

Preferably, the model of the SDRAM memory 101 may be DDR3 SDRAM or over the DDR3 SDRAM.

Preferably, the SD card memory 1021 may be also used to store the system upgrade files.

Preferably, when the flash memory 102 uses a combination of the NAND-Flash memory 1023 and the SD card memory 1021, the MCU 11 may read the system upgrade files from the SD card memory 1021 and upgrade the system, if the upgrade is successful, the MCU 11 may write the upgraded system files into the NAND-Flash memory 1023; if the upgrade fails, the MUC 11 may still read the system files from the NAND-Flash memory 1023. When the flash memory 102 uses a combination of the NAND-Flash memory 1023, the SD card memory 1021 and the eMMC memory 1022, the MCU 11 may read the system upgrade files from the SD card memory 1021 and upgrade the system, if the upgrade is successful, the MCU 11 may write the upgraded system files to the NAND-Flash memory 1023 and the eMMC memory 1022; if the upgrade fails, the MUC 11 may still read the system files from the NAND-Flash memory 1023.

Preferably, when the NCS 1 is started, the MCU 11 can select one of the NAND-Flash memory 1023 and the SD card memory 1021 to read the system file from. The MCU 11 may send out a data request for reading the system files and check whether the data buffer 111 contains the system files, if the data buffer 111 contains the system files, the MCU 11 may read the system files from the data buffer 111; if the data buffer 111 does not contain the system files, the MUC 11 may read the system files from the selected one of the NAND-Flash memory 1023 and the SD card memory 1021.

Preferably, during the operation of the NCS 1, the MCU 11 can select one of the SD card memory 1021 and the eMMC memory 1022 to read the user data from. The MCU 11 may send out a data request for reading the user data and check whether the data buffer 111 contains the user data. If the data buffer 111 contains the user data, the MCU 11 may read the user data from the data buffer 111; if the data buffer 111 does not contain the user data, the MCU 11 may read the user date from the selected one of the SD card memory 1021 and the eMMC memory 1022.

Preferably, during the operation of the NCS 1, the MCU 11 can select one of the SD card memory 1021 and the eMMC memory 1022 to write the user data into. The MCU 11 may send out a data request for writing the user data and judges whether the data buffer 111 is full; if the data buffer 111 is full, the MCU 11 may write the data stored in the data buffer 111 to the corresponding flash memory 102 and write the to-be-written user data into the data buffer 111; if the data buffer 111 is not full, the MCU 11 may write the to-be-written user data to the data buffer 111 directly.

Understandably, the NCS may further include other modules to realize the function of processing the workpiece, for example, RS232 serial port module (not shown) configured to communicate with a host computer and debug; a sensor module (not shown) configured to real-time monitor environmental parameters in order to ensure stable and reliable working system; a USB interface module (not shown) configured to connect the MCP (machine control panel) and an external storage device; a network interface module (not shown) configured to connect the Ethernet system for online upgrade function; a display module (not shown) configured to display the running state of the system and human-computer interaction; a feeding axle (not shown) configured to connect to a feeding axle servo driver which drives the feeding axle to move; a spindle (not shown) configured to connect to a spindle servo driver which drives the spindle to move; a PLC interface configured to connect to an external I/O interface and a hand-wheel interface configured to connect to a hand-wheel controller. Understandably, the NCS may further include other traditional modules which are not listed here.

The embodiment of the present disclosure further provides a numerical control machine tool which may include a machine tool body and a NCS installed in the machine tool body. The NCS can be the NCS described above. The specific structure and operation principle of the NCS are described above and are not recited herein.

Different from the prior art, the disclosure adopts a new memory scheme, the internal memory adopts SDRAM, the flash memory adopts a combination of at least one of the SD card memory and the eMMC memory, and the built-in NAND-Flash memory. The NAND-Flash memory stores system files, which enables the NCS to be useable in the absence of external SD card memory. The SD card memory and the eMMC memory store system files and user data, which not only can be used in the starting of the NCS and reading and writing of the user data, but also can double back up the system files and the user data of the NCS, thereby improve the convenience and reliability of the NCS and reduce the power consumption and cost.

The above description merely depicts some exemplary embodiments of the disclosure, but is not limiting the scope of the disclosure. Any equivalent structure or flow transformations made to the disclosure, or any direct or indirect applications of the disclosure on any other related fields, shall all be covered within the protection of the disclosure.

What is claimed is:

1. A numerical control system (NCS), comprising a storage and a MCU capable of reading data from and writing data into the storage, wherein the MCU comprises a data buffer, the storage comprises an internal memory and a flash memory, the internal memory is configured to store data and programs which are needed when the MCU is in operation; wherein the flash memory comprises at least one of SD card memory and eMMC memory, and a fixed built-in NAND-Flash memory;

the NAND-Flash memory is configured to store system files of the NCS, the SD card memory and the eMMC memory both are configured to store the system files and user data of the NCS;

when the flash memory uses a combination of the NAND-Flash memory and the SD card memory, the MCU reads the system files stored in the NAND-Flash memory and the user data stored in the SD card memory, the system files stored in the SD card memory are for backup purposes;

when the flash memory uses a combination of the NAND-Flash memory and the eMMC memory, the MCU reads the system files stored in the NAND-Flash memory and the user data stored in the eMMC memory, the system files stored in the eMMC memory are for backup purposes;

when the flash memory uses a combination of the NAND-Flash memory, the SD card memory and the eMMC memory, the MCU reads the system files stored in one of the NAND-Flash memory and the SD card memory, the system files stored in the other one of the NAND-Flash memory and the SD card memory are for backup purposes; and reads the user data stored in one of the SD card memory and the eMMC memory, the user data stored in the other one of the SD card memory and the eMMC memory is for backup purposes, the internal memory is an SDRAM memory, the SD card memory is further configured to store system upgrade files.

2. The NCS according to claim 1, wherein the MCU is specifically configured to:

receive a request of reading data and judge whether the data buffer contains the requested data; when the data buffer contains the requested data, the MCU reads the requested data from the data buffer; when the data buffer does not contain the requested data, the MCU triggers an operation of reading the flash memory and reads the requested data from the flash memory; and receive a request of writing data and judge whether the data buffer is full; when the data buffer is full, the MCU writes the data stored in the data buffer to the corresponding flash memory and then writing the to-be-written data to the data buffer; when the data buffer is not full, the MCU writes the to-be-written data to the data buffer directly.

3. The NCS according to claim 1, wherein the NCS further comprises a circuit board, the NAND-Flash memory is fixedly mounted on the circuit board.

4. The NCS according to claim 3, wherein the eMMC memory is fixedly mounted on the circuit board.

5. The NCS according to claim 3, wherein the SD card memory is mounted on the circuit board in a detachable manner.

6. The NCS according to claim 1, wherein the model of the SDRAM memory is DDR3 SDRAM or over the DDR3 SDRAM.

7. The NCS according to claim 1, wherein, when the flash memory uses a combination of the NAND-Flash memory and the SD card memory, the MCU reads the system upgrade files from the SD card memory and upgrades the system; when the upgrade is successful, the MCU writes the upgraded system files into the NAND-Flash memory; when the upgrade fails, the MCU still reads the system files from the NAND-Flash memory;

when the flash memory uses a combination of the NAND-Flash memory, the SD card memory and the eMMC memory, the MCU reads the system upgrade files from the SD card memory and upgrades the system, when the upgrade is successful, the MCU writes the upgraded system files into the NAND-Flash memory and the eMMC memory; when the upgrade fails, the MCU still reads the system files from the NAND-Flash memory.

8. The NCS according to claim 1, wherein, when the NCS is started, the MCU sends out a data request for reading the system files and checks whether the data buffer contains the system files, when the data buffer contains the system files, the MCU reads the system files from the data buffer; when the data buffer does not contain the system files, the MUC selects one of the NAND-Flash memory and the SD card memory and reads the system files from the selected one of the NAND-Flash memory and the SD card memory;

during the operation of the NCS, the MCU sends out a data request for reading the user data and checks whether the data buffer contains the user data, when the data buffer contains the user data, the MCU reads the user data from the data buffer; when the data buffer does not contain the user data, the MCU selects one of one of the SD card memory and the eMMC memory and reads the user date from the selected one of the SD card memory and the eMMC memory;

during the operation of the NCS, the MCU sends out a data request for writing the user data and judges whether the data buffer is full; when the data buffer is full, the MCU selects one of the SD card memory and the eMMC memory and writes the data stored in the data buffer to the selected one of the SD card memory and the eMMC memory and writes the to-be-written user data into the data buffer; when the data buffer is not full, the MCU writes the to-be-written user data to the data buffer directly.

9. An NCS, comprising a storage and a MCU capable of reading data from and writing data into the storage, wherein the MCU comprises a data buffer, the storage comprises an internal memory and a flash memory, the internal memory is configured to store data and programs which are needed when the MCU is in operation; wherein the flash memory comprises at least one of a SD card memory and an eMMC memory, and a fixed built-in NAND-Flash memory;

the NAND-Flash memory is configured to store system files of the NCS, the SD card memory and the eMMC memory both are configured to store the system files and user data of the NCS;

when the flash memory uses a combination of the NAND-Flash memory and the SD card memory, the MCU reads the system files stored in the NAND-Flash memory and the user data stored in the SD card memory, the system files stored in the SD card memory are for backup purposes;

when the flash memory uses a combination of the NAND-Flash memory and the eMMC memory, the MCU reads the system files stored in the NAND-Flash memory and the user data stored in the eMMC memory, the system files stored in the eMMC memory are for backup purposes;

when the flash memory uses a combination of the NAND-Flash memory, the SD card memory and the eMMC memory, the MCU reads the system files stored in one of the NAND-Flash memory and the SD card memory, the system files stored in the other one of the NAND-Flash memory and the SD card memory are for backup purposes; and reads the user data stored in one of the SD card memory and the eMMC memory, the user data stored in the other one of the SD card memory and the eMMC memory is for backup purposes.

10. The NCS according to claim 9, wherein the MCU is specifically configured to:

receive a request of reading data and judge whether the data buffer contains the requested data; when the data buffer contains the requested data, the MCU reads the requested data from the data buffer; when the data buffer does not contain the requested data, the MCU triggers an operation of reading the flash memory and reads the requested data from the flash memory; and receive a request of writing data and judge whether the data buffer is full; when the data buffer is full, the MCU writes the data stored in the data buffer to the corresponding flash memory and then writes the to-bewritten data to the data buffer; when the data buffer is not full, the MCU writes the to-be-written data to the data buffer directly.

11. The NCS according to claim 9, wherein the NCS further comprises a circuit board, the NAND-Flash memory is fixedly mounted on the circuit board.

12. The NCS according to claim 11, wherein the eMMC memory is fixedly mounted on the circuit board.

13. The NCS according to claim 11, wherein the SD card memory is mounted on the circuit board in a detachable manner.

14. The NCS according to claim 9, wherein the internal memory is an SDRAM memory.

15. The NCS according to claim 14, wherein the model of the SDRAM memory is DDR3 SDRAM or over the DDR3 SDRAM.

16. The NCS according to claim 9, wherein the SD card memory is further configured to store system upgrade files.

17. The NCS according to claim 16, wherein,
when the flash memory uses a combination of the NAND-Flash memory and the SD card memory, the MCU reads the system upgrade files from the SD card memory and upgrades the system; when the upgrade is successful, the MCU writes the upgraded system files into the NAND-Flash memory; when the upgrade fails, the MCU still reads the system files from the NAND-Flash memory;
when the flash memory uses a combination of the NAND-Flash memory, the SD card memory and the eMMC memory, the MCU reads the system upgrade files from the SD memory and upgrades the system, when the upgrade is successful, the MCU writes the upgraded system files into the NAND-Flash memory and the eMMC memory; when the upgrade fails, the MCU still reads the system files from the NAND-Flash memory.

18. The NCS according to claim 9, wherein,
when the NCS is started, the MCU sends out a data request for reading the system files and checks whether the data buffer contains the system files, when the data buffer contains the system files, the MCU reads the system files from the data buffer; when the data buffer does not contain the system files, the MUC selects one of the NAND-Flash memory and the SD card memory and reads the system files from the selected one of the NAND-Flash memory and the SD card memory;
during the operation of the NCS, the MCU sends out a data request for reading the user data and checks whether the data buffer contains the user data, when the data buffer contains the user data, the MCU reads the user data from the data buffer; when the data buffer does not contain the user data, the MCU selects one of the SD card memory and the eMMC memory and reads the user date from the selected one of the SD card memory and the eMMC memory;
during the operation of the NCS, the MCU sends out a data request for writing the user data and judges whether the data buffer is full; when the data buffer is full, the MCU selects one of the SD card memory and the eMMC memory and writes the data stored in the data buffer to the selected one of the SD card memory and the eMMC memory and writes the to-be-written user data into the data buffer; when the data buffer is not full, the MCU writes the to-be-written user data to the data buffer directly.

19. A numerical control machine tool comprising a machine tool body and a NCS mounted on the machine tool body, wherein the NCS comprises a storage and a MCU capable of reading data from and writing data into the storage, the MCU comprises a data buffer, the storage comprises an internal memory and a flash memory, the internal memory is configured to store data and programs which are needed when the MCU is in operation; wherein the flash memory comprises at least one of SD card memory and eMMC memory, and a fixed built-in NAND-Flash memory;
the NAND-Flash memory is configured to store system files of the NCS, the SD card memory and the eMMC memory both are configured to store the system files and user data of the NCS;
when the flash memory uses a combination of the NAND-Flash memory and the SD card memory, the MCU reads the system files stored in the NAND-Flash memory and the user data stored in the SD card memory, the system files stored in the SD card memory are for backup purposes;
when the flash memory uses a combination of the NAND-Flash memory and the eMMC memory, the MCU reads the system files stored in the NAND-Flash memory and the user data stored in the eMMC memory, the system files stored in the eMMC memory are for backup purposes;
when the flash memory uses a combination of the NAND-Flash memory, the SD card memory and the eMMC memory, the MCU reads the system files stored in one of the NAND-Flash memory and the SD card memory, the system files stored in the other of the NAND-Flash memory and the SD card memory are for backup purposes; and reads the user data stored in one of the SD card memory and the eMMC memory, the user data stored in the other of the SD card memory and the eMMC memory is for backup purposes.

* * * * *